Patented Sept. 26, 1944

2,358,925

UNITED STATES PATENT OFFICE 2,358,925

INSECTICIDE

Herbert L. J. Haller, Washington, D. C., and William F. Barthel, College Park, Md., assignors to the United States of America as represented by Claude R. Wickard, Secretary of Agriculture, and his successors in office No Drawing. Application January 22, 1944,
Serial No. 519,356

8 Claims. (Cl. 167—33)

(Granted under the act of March 3, 1883, as
amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to use of any royalty thereon.

This invention relates to the manufacture and use of materials for destroying or checking the growth or multiplication of living organisms whether plant or animal which are economically injurious to man.

The principal object of this invention is to provide materials suitable for use as insecticides.

Another object of this invention is to provide synthetic organic insecticides, the production of which is not influenced by climatic variations, growing conditions, localized production, and transportation, and thus to replace or supplement naturally occurring insecticidal materials such as pyrethrum, rotenone, and nicotine.

Another object of this invention is to provide insecticidal materials which may replace insecticides which are known to leave harmful residues, such as arsenicals.

We have found that certain organic compounds of the class known as alpha-thiotoluylmorpholines, which are obtained as reaction products when methyl aryl ketones are heated with morpholine and sulfur, are highly toxic to many kinds of insects.

When ketones of the type referred to above are heated with morpholine and sulfur, a shift occurs in the position of the keto double bond and sulfur is subsituted for the keto oxygen with the elimination of water. The reaction may be represented as follows:

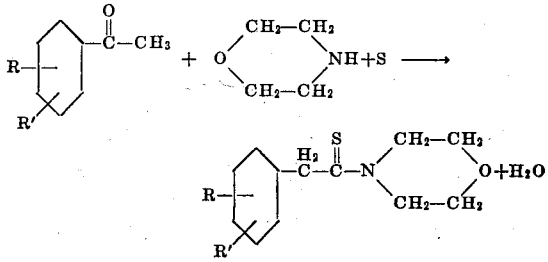

where R and R' are selected from the group consisting of hydrogen, halogen, alkyl, alkoxy, aryl, and aryloxy.

The essential active ingredient of our insecticidal compositions, namely, thiotoluylmorpholine or a substituted thiotoluylmorpholine, may be ground to an impalpable powder which, either alone or together with diluents or carriers, may be used as a dust for the control of injurious insects.

Also, insecticidal spray compositions may be prepared by suspending the impalpable powder in a liquid medium either mechanically or with solvents. Thus, when the powder is dissolved in an appropriate solvent, such as acetone, and the resulting solution is added to water, a fine colloidal suspension is obtained. Such suspensions may be applied directly to the host plant, although it may be desirable in some cases to supplement the spray with conditioners, such as dispersing agents, wetting agents, stickers and spreaders. In addition, certain of the thiotoluylmorpholines are soluble in oil and, consequently, they may be applied as a component of an oil emulsion spray.

In view of the specificity of synthetic organic insecticidal materials to insects, it may also be desirable to admix certain members of the class of compounds disclosed in this application with known insecticides, such as pyrethrum, derris, the arsenicals, phenothiazine, and so forth, in order to produce a material of more general use as an insecticide.

Insecticides of which the active ingredient is a compound of the general class of thiotoluylmorpholines cause little or no damage to foliage of plants upon which they are applied.

The following example illustrates a method for preparing the thiotoluylmorpholines:

31 grams of p-methylacetophenone, 22 grams of morpholine, and 8 grams of sulfur are heated under reflux for 6 hours. The reaction product is filtered to remove unreacted sulfur and then subjected to distillation to remove excess ketone and base. The residue contains the active ingredient 4 - (p - methyl-alpha-thiotoluyl) -morpholine, which may be obtained in a pure state by recrystallization from ethanol. For the preparation of suitable dusts or sprays for the control of injurious insects, it is not necessary, however, to use the thiotoluylmorpholines in a pure form. The reaction product may be used without separating the unreacted components. These components have been found to offer no antagonism to the insecticidal property of the reaction product. If an impalpable powder is to be prepared, however, it will be found advantageous to remove all excess liquid from the reaction mixture.

The effectiveness of thiotoluylmorpholines is shown by the following results:

1. When 4 -(p-methyl-alpha-thiotoluyl) -morpholine was used as a spray at a concentration of 8 lbs. per 100 gals., it killed 100 percent of the 4th instar of the melonworm in 4 days. At the same concentration it killed 100 percent of the European corn borer in 48 hours; 96 percent of the 4th instar of the southern armyworm in 2 days, and 100 percent in 4 days; and 72 percent of the adult blister beetle in 6 days.

2. When 4-(alpha-thiotoluyl)-morpholine was used as a spray at a concentration of 8 lbs. per 100 gallons, it killed 87 percent of the 4th instar of the southern armyworm in 2 days, and 100 percent in 4 days; 100 percent of the European corn borer in 2 days; 100 percent of the 4th instar of the melonworm in 4 days; and 96 percent of the 4th instar of the pickleworm in 2 days, and 100 percent in 4 days. When used as a dust at a concentration of 185 mgs. per square centimeter, it killed 100 percent of the 4th instar of the pickleworm in 2 days; and 100 percent of the 4th instar of the southern armyworm in 2 days.

3. When 4-(p-chloro-alpha-thiotoluyl)-morpholine was used as a spray at a concentration of 8 lbs. per 100 gals., it killed 100 percent of the 4th instar of the southern armyworm in 4 days. When used as a dust at a concentration of 110 mgs. per square centimeter, it killed 92 percent of the 4th instar of the southern armyworm in 2 days.

4. When 4 - (p - methoxy-alpha-thiotoluyl) - morpholine was used as a dust at a concentration of 390 mgs. per square centimeter, it killed 91 percent of the 4th instar of the southern armyworm. When sprayed at a concentration of 8 lbs. per 100 gals., it killed 86.7 percent of the European corn borer.

It will be understood that the compounds named specifically above are given only as examples, and it will be apparent to those skilled in the art that a great many derivatives and substitution products are possible within the class of organic compounds covered by our invention.

Having thus described our invention, we claim:

1. An insecticidal composition containing as an essential active ingredient a compound having the formula:

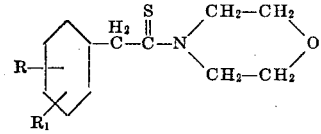

where R and R' are selected from the group consisting of hydrogen, halogen, alkyl, alkoxy, aryl, and aryloxy; and a carrier therefor.

2. An insecticidal composition containing as an essential active ingredient 4-(alpha-thiotoluyl)-morpholine, and a carrier therefor.

3. An insecticidal composition containing as an essential active ingredient 4-(p-methyl-alpha-thiotoluyl)-morpholine, and a carrier therefor.

4. An insecticidal composition containing as an essential active ingredient 4-(p-chloro-alpha-thiotoluyl)-morpholine, and a carrier therefor.

5. An insecticidal composition containing as an essential active ingredient a compound having the formula:

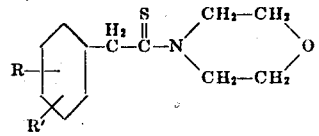

where R and R' are selected from the group consisting of hydrogen, halogen, alkyl, alkoxy, aryl, and aryloxy, said compound being suspended in a compatible liquid together with spreading and sticker conditioners.

6. An insecticidal composition comprising the reaction product obtained by heating morpholine and sulfur under reflux for about six hours with a compound having the formula:

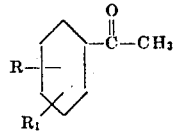

where R and R' are selected from the group consisting of hydrogen, halogen, alkyl, alkoxy, aryl, and aryloxy; and a carrier therefor.

7. An insecticidal composition comprising the reaction product obtained by heating morpholine and sulfur under reflux for about six hours with a compound having the formula:

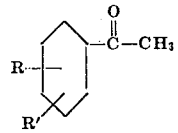

where R and R' are selected from the group consisting of hydrogen, halogen, alkyl, alkoxy, aryl, and aryloxy, and removing excess liquid from the reaction mixture; and a carrier therefor.

8. An insecticidal composition comprising the reaction product obtained by heating morpholine and sulfur under reflux for about six hours with a compound having the formula:

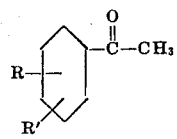

where R and R' are selected from the group consisting of hydrogen, halogen, alkyl, alkoxy, aryl, and aryloxy, and removing excess liquid from the reaction mixture, said reaction product being suspended in a compatible liquid together with spreading and sticker conditioners.

HERBERT L. J. HALLER.
WILLIAM F. BARTHEL.